(12) United States Patent
Mukaida et al.

(10) Patent No.: US 8,200,891 B2
(45) Date of Patent: *Jun. 12, 2012

(54) MEMORY CONTROLLER, MEMORY SYSTEM WITH MEMORY CONTROLLER, AND METHOD OF CONTROLLING FLASH MEMORY

(75) Inventors: Naoki Mukaida, Tokyo (JP); Takeshi Kamono, Tokyo (JP)

(73) Assignee: TDK Corporation, Tokyo (JP)

( * ) Notice: Subject to any disclaimer, the term of this patent is extended or adjusted under 35 U.S.C. 154(b) by 320 days.

This patent is subject to a terminal disclaimer.

(21) Appl. No.: 12/701,789

(22) Filed: Feb. 8, 2010

(65) Prior Publication Data
US 2010/0205356 A1 Aug. 12, 2010

(30) Foreign Application Priority Data

Feb. 9, 2009 (JP) ................................. 2009-027740

(51) Int. Cl.
*G06F 12/10* (2006.01)
(52) U.S. Cl. ......... 711/103; 711/165; 711/203; 711/206
(58) Field of Classification Search .................. 711/103, 711/165, 203, 206
See application file for complete search history.

(56) References Cited

U.S. PATENT DOCUMENTS

| | | | |
|---|---|---|---|
| 6,081,447 A | 6/2000 | Lofgren et al. | |
| 6,230,233 B1 | 5/2001 | Lofgren et al. | |
| 6,594,183 B1 | 7/2003 | Lofgren et al. | |
| 6,732,221 B2 | 5/2004 | Ban | |
| 6,850,443 B2 | 2/2005 | Lofgren et al. | |
| 6,985,992 B1 | 1/2006 | Chang et al. | |
| 8,001,318 B1* | 8/2011 | Iyer et al. | 711/103 |
| 8,060,718 B2* | 11/2011 | Freitas et al. | 711/165 |
| 2006/0106972 A1* | 5/2006 | Gorobets et al. | 711/103 |
| 2007/0103992 A1 | 5/2007 | Sakui et al. | |
| 2008/0140918 A1* | 6/2008 | Sutardja | 711/103 |
| 2009/0113121 A1* | 4/2009 | Lee et al. | 711/103 |
| 2009/0138654 A1* | 5/2009 | Sutardja | 711/103 |
| 2009/0254729 A1* | 10/2009 | Lin et al. | 711/170 |
| 2010/0017555 A1* | 1/2010 | Chang et al. | 711/103 |
| 2010/0115186 A1* | 5/2010 | Chang et al. | 711/103 |
| 2010/0185805 A1* | 7/2010 | Chen et al. | 711/103 |
| 2011/0271046 A1* | 11/2011 | Iyer et al. | 711/103 |

FOREIGN PATENT DOCUMENTS

JP 2007-133683 A 5/2007

OTHER PUBLICATIONS

U.S. Appl. No. 12/701,831, filed Feb. 8, 2010, Mukaida.

* cited by examiner

*Primary Examiner* — John Lane
(74) *Attorney, Agent, or Firm* — Posz Law Group, PLC

(57) ABSTRACT

In the control of the number of program-erase cycles, physical blocks (PBs) are divided into plural groups on a basis of the number of program-erase cycles and a search for a free PB is performed in the groups when assigning a logical block (LB) to the free PB. In the search, a free PB among a group covering a small number of program-erase cycles precedes that among a group covering a large number of program-erase cycles. Further, when searching out a free PB in the search, data stored in a PB (source PB) included in a group covering a smaller number of program-erase cycles than that covered by a group including the free PB searched out are transferred to the free PB if there is the source PB. The source PB is a PB to which a LB is assigned earliest among a group including it.

6 Claims, 9 Drawing Sheets

FIG. 5A

FIRST FREE BLOCK TABLE

| | | | | | | | |
|---|---|---|---|---|---|---|---|
| 0 | 0 | 0 | 0 | 0 | 0 | 0 | 0 |
| 1 | 0 | 0 | 0 | 0 | 0 | 0 | 1 |
| 0 | 0 | 0 | 1 | 0 | 0 | 0 | 0 |
| 0 | 0 | 0 | 1 | 0 | 0 | 0 | 0 |
| 0 | 0 | 0 | 0 | 0 | 0 | 1 | 0 |
| 0 | 0 | 0 | 0 | 0 | 0 | 0 | 0 |
| 0 | 0 | 1 | 0 | 0 | 0 | 0 | 0 |
| 0 | 0 | 0 | 0 | 0 | 0 | 0 | 0 |
| | | | ⋮ | | | | |
| 0 | 0 | 0 | 0 | 0 | 0 | 0 | 0 |

FIG. 5B

SECOND FREE BLOCK TABLE

| | | | | | | | |
|---|---|---|---|---|---|---|---|
| 0 | 0 | 0 | 0 | 0 | 0 | 0 | 1 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| | | | ⋮ | | | | |
| 0 | 0 | 0 | 0 | 0 | 0 | 0 | 0 |

FIG. 5C

THIRD FREE BLOCK TABLE

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| ⋮ | | | | | | | |
| 0 | 0 | 0 | 0 | 0 | 0 | 0 | 0 |

FIG. 7

| PBA | LINK NUMBER | | THE NUMBER OF PROGRAM-ERASE CYCLES |
|---|---|---|---|
| #0 | #118 | #572 | 1000 |
| #1 | #207 | #934 | 504 |
| #2 | #71 | #1043 | 378 |
| #3 | #199 | #556 | 468 |
| #4 | #267 | #734 | 1125 |
| #5 | #345 | #885 | 278 |
| . | . | . | . |
| . | . | . | . |

FIRST GROUP

| HIGHEST | #36 |
|---|---|
| LOWEST | #857 |

SECOND GROUP

| HIGHEST | #936 |
|---|---|
| LOWEST | #975 |

THIRD GROUP

| HIGHEST | #977 |
|---|---|
| LOWEST | #1111 |

MEMORY CONTROLLER, MEMORY SYSTEM WITH MEMORY CONTROLLER, AND METHOD OF CONTROLLING FLASH MEMORY

CROSS-REFERENCE TO PRIOR AND RELATED APPLICATIONS

This application relates to and claims the benefit of priority from Japanese Patent Application number 2009-27740, filed on Feb. 9, 2009, the entire disclosure of which is incorporated herein by reference. This application is also related to U.S. patent application Ser. No. 12/701,831, filed on Feb. 8, 2010 entitled MEMORY CONTROLLER, MEMORY SYSTEM WITH MEMORY CONTROLLER, AND METHOD OF CONTROLLING FLASH MEMORY, and to U.S. patent application Ser. No. 12/656,851, filed on Feb. 18, 2010 entitled MEMORY CONTROLLER, MEMORY SYSTEM WITH MEMORY CONTROLLER, AND METHOD OF CONTROLLING FLASH MEMORY.

BACKGROUND

The present invention generally relates to a memory controller for a flash memory, a flash memory system having the memory controller, and a method of controlling the flash memory.

In a memory system employing a flash memory, wear leveling is applied in order to even out the number of program-erase cycles (the number of times of execution of data erasing) among physical blocks in a flash memory, as shown in Reference 1 (JP-A-2007-133683).

There are substantially two wear leveling modes. One is called a dynamic wear leveling or a passive wear leveling, hereinafter referred as a "dynamic wear leveling", and the other is called a static wear leveling or an active wear leveling, hereinafter referred as a "static wear leveling". The dynamic wear leveling is to even out the number of program-erase cycles among physical blocks except static physical blocks. The static wear leveling is to even out the number of program-erase cycles among physical blocks including the static physical blocks. Each of the static physical blocks is a physical block storing static data, which are rarely updated or rewritten.

In the static wear leveling, static data stored in a static physical block are transferred to another physical block in order to store static data in a physical block of which the number of program-erase cycles is large. In the dynamic wear leveling, static data are not transferred unless it is necessary to rewrite them. Therefore, in a case where there are many static physical blocks (that is, where a ratio of static physical blocks to all physical blocks each storing data is high), it is preferable to apply the static wear leveling. And, in a case where there are few static physical blocks (that is, where a ratio of static physical blocks to all physical blocks each storing data is low), it is preferable to apply the dynamic wear leveling.

SUMMARY

In wear leveling shown in Reference 1 (JP-A-2007-133683), it is required that a user selects any one from 3 modes, that is the dynamic wear leveling, the static wear leveling, and combination of them. The selected mode is applied to a memory system. However, in general, it is difficult for a user to select an appropriate mode from the 3 modes for a memory system in consideration of a ratio of static data to be stored in the memory system to dynamic data to be stored in that, which dynamic data are often updated or rewritten.

In a case where the selected mode is inappropriate, an adverse effect is caused. For example, in a case where the dynamic wear leveling is selected for a memory system to be stored many static data, the number of program-erase cycles of a physical block in which dynamic data are often stored might increase noticeably; in a case where the static wear leveling is selected for a memory system to be stored many dynamic data, useless data transferring is often performed between physical blocks.

In a case where the static wear leveling is drastically performed, that is, wear leveling operations are performed so that the number of program-erase cycles of each physical block falls in a narrow range anytime (so that a difference between the largest number of program-erase cycles and the smallest number of that among all physical blocks is kept as small as possible), static data are often transferred from one physical block to another physical block and the number of times that data erasing is executed in a flash memory as a whole (the sum total of the number of program-erase cycles of each physical block) increases. As a result, a flash memory deteriorates prematurely, that is, physical blocks in a flash memory wear out prematurely.

Therefore, the object of the present invention is to resolve a problem that the extreme evenness of the number of program-erase cycles among physical blocks occur, and to slow the increase of the number of program-erase cycles as a whole (the sum total of the number of program-erase cycles of each physical block) in comparison with a case where common wear leveling are applied, without making an user select a wear leveling mode.

According to the first aspect, a memory controller for controlling access to a flash memory, in which data erasing is performed in physical blocks, comprising:

a logical block management unit which forms plural logical blocks each composed of plural logical sectors to each of which a logical address for a host system is assigned;

a program-erase cycles management unit which manages a number of program-erase cycles of each physical block;

a assignment unit which assigns a logical block composed of plural logical sectors each assigned a logical address provided from a host system to a physical block;

a search unit which searches out a free physical block among each of groups into which physical blocks are divided on a basis of one or more predetermined thresholds relating to a number of program-erase cycles;

a identifying unit which identifies a physical block to which a logical block is assigned earliest among each of the groups;

a data writing unit which, in response to a request issued by the host system, identifies a logical block including a logical sector corresponding to a logical address pertaining to the request and stores data provided from the host system in a physical block corresponding to the logical block identified; and a data transfer unit which transfers data stored in a physical block identified by the identifying unit to a free physical block searched out by the search unit;

wherein, when the assignment unit assigns a logical block to a physical block, the search unit performs a search for a free physical block so that a free physical block among a first group of the groups precedes a free physical block among a second group of the groups, which covers a larger number of program-erase cycles than that covered by the first group, in the search; and wherein, in a case where there is at least one physical block included in a third group of the groups, which covers a smaller number of program-erase cycles than that covered by a group including a free physical block searched out in the search, the identifying unit identifies a physical block to which a logical block is assigned earliest among the third group, the data transfer unit transfers data stored in the physical block identified to the free physical block searched out, and the assignment unit assigns the logical block to the physical block identified after the data transfer unit completes data transfer.

According to the first aspect, a memory controller for controlling access to a flash memory, in which data erasing is performed in physical blocks, comprising:

a logical block management unit which forms plural logical blocks each composed of plural logical sectors to each of which a logical address for a host system is assigned;

a virtual block management unit which forms plural virtual blocks into which physical blocks are divided;

a program-erase cycles management unit which manages a number of program-erase cycles of each virtual block;

a assignment unit which assigns a logical block composed of plural logical sectors each assigned a logical address provided from a host system to a virtual block;

a search unit which searches out a free virtual block among each of groups into which virtual blocks are divided on a basis of one or more predetermined thresholds relating to a number of program-erase cycles;

a identifying unit which identifies a virtual block to which a logical block is assigned earliest among each of the groups;

a data writing unit which, in response to a request issued by the host system, identifies a logical block including a logical sector corresponding to a logical address pertaining to the request and stores data provided from the host system in a virtual block corresponding to the logical block identified; and a data transfer unit which transfers data stored in a virtual block identified by the identifying unit to a free virtual block searched out by the search unit;

wherein, when the assignment unit assigns a logical block to a virtual block, the search unit performs a search for a free virtual block so that a free virtual block among a first group of the groups precedes a free virtual block among a second group of the groups, which covers a larger number of program-erase cycles than that covered by the first group, in the search; and wherein, in a case where there is at least one virtual block included in a third group of the groups, which covers a smaller number of program-erase cycles than that covered by a group including a free virtual block searched out in the search, the identifying unit identifies a virtual block to which a logical block is assigned earliest among the third group, the data transfer unit transfers data stored in the virtual block identified to the free virtual block searched out, and the assignment unit assigns the logical block to the virtual block identified after the data transfer unit completes data transfer.

According to the present invention, it is possible to resolve the problem and to slow the increase of the number of program-erase cycles as a whole in comparison with a case where common wear leveling are applied, without making an user select a wear leveling mode.

BRIEF DESCRIPTION OF THE DRAWINGS

FIG. 5A shows the configuration of the first free block table.

FIG. 5B shows the configuration of the second free block table.

FIG. 5C shows the configuration of the third free block table.

FIG. 7 shows an example of a page information table.

DETAILED DESCRIPTION OF THE EMBODIMENT

Figure 1:
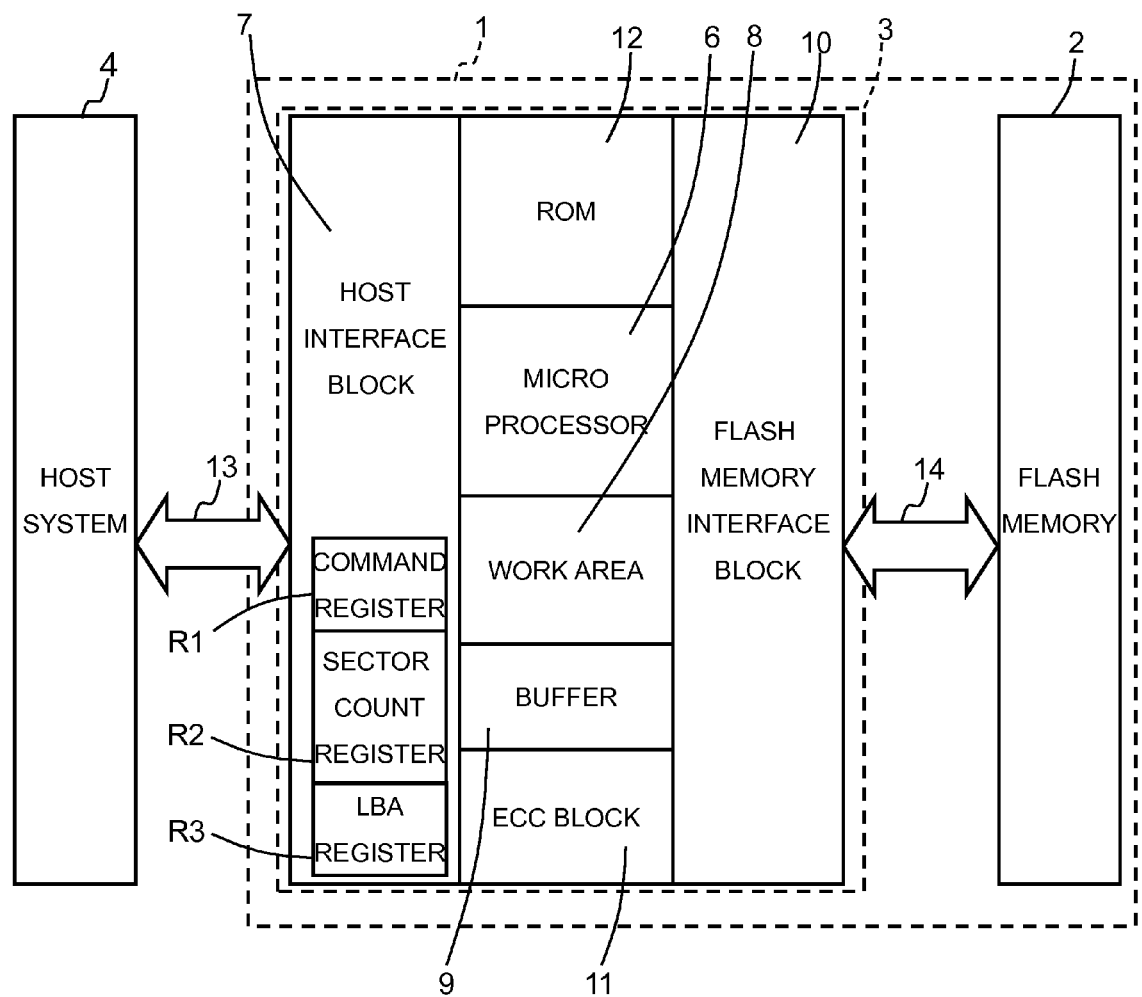
FIG. 1 shows a configuration of a flash memory system in accordance with an embodiment of the present invention.

FIG. 1 is a block diagram schematically showing the structure of a flash memory system 1 as specific embodiment of the present invention.

As shown in FIG. 1, the flash memory system 1 is composed of a flash memory 2 and a memory controller 3 to control the flash memory 2.

The flash memory system 1 is connected through an external bus 13 to a host system 4. The host system 4 is composed of a CPU (Central Processing Unit), a companion (peripheral) chip and so on. The CPU controls behavior of the host system 4. The companion (peripheral) chip controls data transfer between the host system 4 and the flash memory system 1. The host system 4 may be a personal computer processing various information, such as character information, audio information, image information and so on, or various types of information processing equipment, such as a digital camera.

As shown in FIG. 1, the memory controller 3 comprises a microprocessor 6, a host interface block 7, a SRAM (Static Random Access Memory) 8, a buffer memory 9, a flash memory interface block 10, an ECC block 11, and a ROM (Read Only Memory) 12. These functional blocks composing the memory controller 3 are integrated into one chip. Next, each functional block will is described in detail.

The host interface block 7 receives data, address information, external commands, and so on from the host system 4. Also, the host interface block 7 sends data, status information, and so on to the host system 4. The external command is for the host system 4 to control the memory controller 3. Data and so on inputted into the flash memory system 1 are transferred, through the host interface block 7 as an inlet for data, to a functional block such as a buffer memory 9. Also, data and so on outputted from the flash memory system 1 are transferred, through the host interface block 7 as an outlet for data, to the host system 4.

The host interface block 7 is provided with a command register R1, a sector count register R2, and a LBA register R3. The host system 4 writes a command code of an external command, such as write command or read command, to the command register R1, writes the number of sectors of data to be written or to be read to the sector count register R2, and writes a LBA (Logical Block Address) corresponding to a start address of data to be written or to be read to the LBA register R3. The LBA is an address assigned to a logical sector having a capacity of 1 sector (512 bytes).

The SRAM (Static Random Access Memory) 8 is a volatile memory for temporarily holding data required for controlling the flash memory 2. For example, a defective block table, an address translation table, a search table and so on are made up and updated on the SRAM 8. Hereupon, the defective block table is to manage information designating a defective physical block; the address translation table is to manage information indicating the relationship between logical blocks, each composed plural logical sectors, and physical blocks; The search table is to search a physical block which is in erased state, or which stores only needless data.

The buffer memory 9 is a volatile memory for temporarily holding data to be written to flash memory 2, or data read from the flash memory 2.

The flash memory interface block 10 controls transfer of data, address information, status information, internal commands and so on, between the memory controller 3 and the flash memory 2. The internal commands are for the memory controller 3 to control the flash memory 2, that is, the flash memory 2 works according to the internal command.

The ECC block 11 generates an ECC (Error Correcting Code) pertaining to data to be written to the flash memory 2. Data are stored together with an ECC pertaining thereto. Further, the ECC block 11 detects and corrects bit errors in data read from the flash memory 2 on a basis of an ECC pertaining to the data.

The ROM 12 is a nonvolatile memory, and stores firmware required for controlling the flash memory 2. Incidentally, only minimum firmware required for booting the flash memory system 1 may be stored in the ROM 12 and the other firmware may be stored in the flash memory 2.

A microprocessor 6 reads a program code from the ROM 12 or the flash memory 2, and controls all functional blocks included in the memory controller 3 according to the program code read. The program code specifies behavior of the microprocessor 6. According to the program code, the microprocessor 6 controls access to the flash memory 2. Incidentally, in a case where a program code is stored in the flash memory 2, the program code is read from the flash memory 2 and held in the SRAM 8 when the flash memory system 1 is booted.

The flash memory 2 is NAND type flash memory, and comprises a register and a memory cell array composed of a plurality of memory cells arranged in a matrix. The memory cell array comprises a plurality of memory cell strings and a plurality of word lines. The memory cell strings are each composed of a plurality of memory cells connected in series. The word lines are used to select a memory cell from the each memory cell string. In data writing (programming), data retained in the register are stored in the memory cells selected by using the word lines. In data reading, data read from the memory cells selected by using the word lines are retained in the register. Incidentally, in common NAND type flash memories, there are flash memories composed of memory cells of SLC (Single Level Cell) type and flash memories composed of memory cells of MLC (Multi Level Cell) type.

In a NAND type flash memory, data reading and data writing are performed in pages (physical pages), data erasing is performed in blocks (physical blocks), each physical page comprises a user area and a redundant area, and each physical block is composed of plural physical pages. For example, a physical page comprises a user area having a capacity of 4 sectors (2048 bytes) and a redundant area having a capacity of 64 bytes, and a physical block comprises 64 physical pages. A user area stores data provided from the host system 4, and is treated as comprising plural of sector areas each having a capacity of 1 sector (512 bytes). A redundant area stores additional data, to which data stored in a user area pertains, such as an ECC (Error Correcting Code), logical address information, or a block status (flag).

The logical address information is information for identifying a logical block corresponding to a physical block with it. The block status is a flag for indicating whether or not a physical block with it is a defective physical block, which is not able to normally perform data writing (programming) and so on. Incidentally, among defective blocks, there are an initial defective block and a running defective block. The initial defective block is a defective block detected before the flash memory is shipped out of the factory. The running defective block is a defective block generated during use. A block status indicating the initial defective block is written before shipping. In flash memories of some manufacturers, a block status indicating the initial defective block is written to a user area. A criterion to determine whether or not a physical block is the running defective block is a matter of design.

In this embodiment, when performing data writing operations, the host system 4 writes a command code of a write command to the command register R1, writes the number of sectors of write data to the sector count register R2, and writes a LBA corresponding to a start address of the write data to the LBA register R3. Logical sectors corresponding to the write data are identified on a basis of information held in the sector count register R2 and the LBA register R3, and the write data are written to a physical block corresponding to a logical block including the identified logical sectors.

In a case where there are plural logical blocks including the identified logical sectors, data writing operations are performed in the logical blocks. For example, In a case where there are 2 logical blocks including the identified logical sectors, data writing operations corresponding to one logical block of the 2 logical blocks and data writing operations corresponding to the other logical block of the 2 logical blocks are performed separately. In the data writing operations, data corresponding to logical sectors included in the one logical block are written to a physical block corresponding to the one logical block, and data corresponding to logical sectors included in the other logical block are written to a physical block corresponding to the other logical block.

The host system manages address space by assigning LBAs (logical block addresses) to each logical sector having a capacity of 1 sector (512 bytes). The memory controller divides logical sectors into logical blocks, and assigns one logical block to one or more physical blocks.

The relationship between logical blocks and physical blocks may be managed in zones each including plural logical blocks. Specifically, logical blocks are divided into logical zones, and address translation tables are made up and updated in the logical zones.

The address translation tables are made up and updated on the SRAM 8. The address translation tables are made up on a basis of logical address information stored in a redundant area of a physical page in a physical block when the memory system 1 is booted or when the address translation tables are required respectively. In order to save time to make up the address translation tables, the address translation tables may be stored in the flash memory 2, and may be read from the flash memory 2 when the address translation tables are required.

In a case where the address translation tables are stored in the flash memory 2, the latest address translation tables are stored in the flash memory 2 anytime in order to avoid losing the address translation tables when a power failure occurs. That is, every time the relationship between logical blocks and physical blocks changes and a address translation table relating to the change of the relationship is updated, the updated address translation tables are stored in the flash memory 2. Operations for storing the address translation tables are performed in logical zones (or address translation tables) as well as operations for making up or updating them.

By referring to FIG. 2, a specific example of the relationship between logical blocks and physical blocks will be described. Further, in the following explanation, an object X of which ID is #Y may be called a "X of ID #Y". For example, a logical sector of which LBA (Logical Block Address) is #0 may be called "a logical sector of LBA #0", and a physical block of which PBA (Physical Block Address) is #234 may be called "a physical block of PBA #234".

Figure 2:
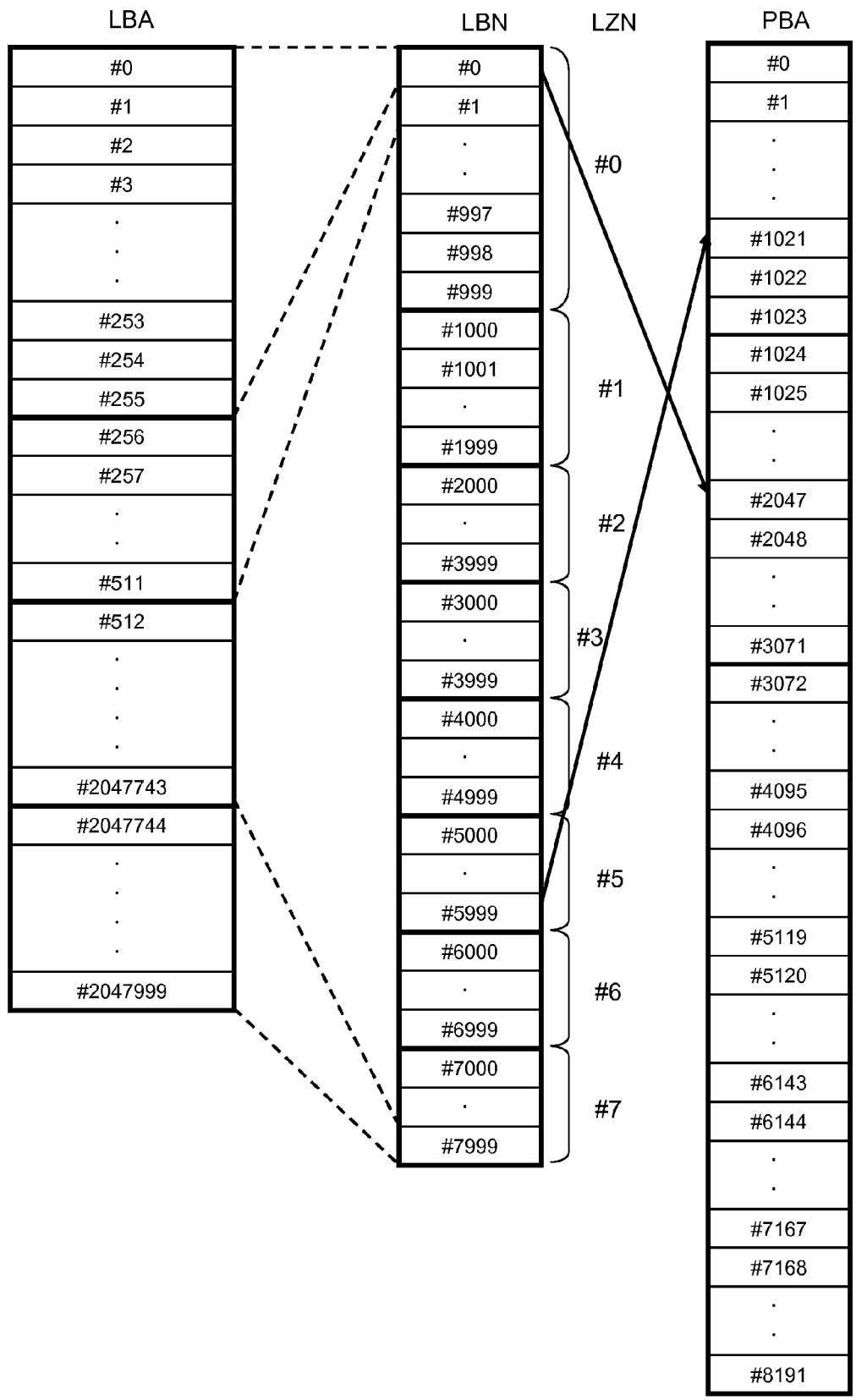
FIG. 2 is an illustration for relationship logical blocks and physical blocks.

In FIG. 2, 2048000 logical sectors of LBA #0 to #2047999 are allocated to 8192 physical blocks in the flash memory 2.

Plural logical blocks each comprising plural logical sectors are formed (Plural logical sectors are divided into plural logical blocks). LBN (Logical Block Number) which is a serial number for a logical block is assigned to each logical block. Also, a logical block is assigned to a physical blocks in the flash memory 2. In this example, 2408000 logical sectors are divided into 8000 logical blocks, each of which is formed of 256 logical sectors assigned serial LBAs. Specifically, 256 logical sectors of LBA #0 to #255 compose a logical block of LBN #0; 256 logical sectors of LBA #256 to #511 compose a logical block of LBN #1. Similarly, the following logical blocks are formed. As a result, 8000 logical blocks of LBN #0 to #7999 are formed of 2408000 logical sectors of LBA #0 to #2047999.

Further, plural logical zones each comprising plural logical blocks are formed (Plural logical blocks are divided into plural logical zones). LZN (Logical Zone Number) which is a serial number for a logical zone is assigned to each logical zone. In this example, each of which is formed of 1000 logical blocks, that is, 8000 logical blocks are evenly divided into 8 logical zones. Specifically, 1000 logical blocks of LBN #0 to #999 compose a logical zone of LZN #0; 1000 logical blocks of LBN #1000 to #1999 compose a logical zone of LZN #1, 1000 logical blocks of LBN #2000 to #2999 compose a logical zone of LZN #2. Similarly, the following logical zones are formed. As a result, 8 logical zones of LZN #0 to #7 are formed of 8000 logical blocks of LBN #0 to #7999.

The flash memory 2 comprise 8192 physical blocks each having PBA (physical block address) which is a unique address in the flash memory 2. In general, a flash memory has some initial defective physical blocks, and physical blocks in a flash memory have finite program-erase cycling capability. Therefore, many physical blocks become a defective physical block after exceeding their capability limits. That is, by performing data programming and data erasing, physical blocks degrade and wear out. As a result, they become a defective physical block (running defective physical block).

In general, there are a flash memory with single level cells and a flash memory with multi level cells. Data retention time in a flash memory with multi level cells is shorter than that in a flash memory with single level cells. Also, according as the number of program-erase cycles (the number of times of execution of data erasing) increases, data retention time shortens. And especially when the number of program-erase cycles is getting close to a capability limit or exceeds a capability limit, data retention time shortens markedly. In a flash memory with multi level cells, the reduction in data retention time is a serious problem.

When storing data in flash memory 2, data are stored in a physical block to which a logical block corresponding to the data is assigned. The relationship between a logical block and a physical block to which the logical block is assigned is managed on a basis of above the above address translation table. When assigning a logical block to a free physical block, the free physical block is searched out with the above search table. The free physical block is in erased state or is a physical block storing only needless data. In a free physical block storing needless data, data erasing is performed before data writing.

When updating data ("old data") stored in flash memory 2, a logical block corresponding to "the old data" is newly assigned to a physical block, which is a free physical block, and then "new data" corresponding to the same logical block as "the old data" are stored in the physical block. Because "new data" stored in the physical block replace "the old data", "the old data" is treated as ineffective data. When all data stored in a previous physical block storing "the old data" becomes ineffective data, the previous physical block becomes a free physical block.

In a case where there are plural sector of data corresponding to the same logical sector, the newest one of them is effective data and the other of them ineffective data. Therefore, when all data stored in a physical block become ineffective data, the physical block becomes a free physical block. That is, a physical block not storing effective data is treated as a free physical block. Incidentally, the free physical block is subjected to data erasing before a logical block is newly assigned to it. The data erasing may be performed just after becoming the free physical block or may be performed just before assigning a logical block.

When updating data stored in a flash memory, a physical block to which new data are written is usually different from a physical block storing old data corresponding to the same logical block as the new data. Therefore, in a logical block corresponding to dynamic data to be often updated, a physical block to which the logical block is assigned often change. Also, in a logical block corresponding to static data to be rarely updated, a physical block to which the logical block is assigned rarely changes.

In such the data updating, by assigning a logical block corresponding to dynamic data to a physical block, the number of program-erase cycles of the physical block increases rapidly. Also, by assigning a logical block corresponding to static data to a physical block, the number of program-erase cycles of the physical block increases slowly. Therefore, unless wear leveling operations are performed, a difference between the number of program-erase cycles of a physical block having a tendency to be assigned a logical block corresponding to dynamic data and that of a physical block having a tendency to be assigned a logical block corresponding to static data becomes large. As a result, the only physical blocks having a tendency to be assigned a logical block corresponding to dynamic data wear out prematurely, and then the life of a flash memory shortens.

To address the above problem, for example, the memory controller 3 performs the following wear leveling operations. In this wear leveling operations, when the number of program-erase cycles of a free physical block least often subjected to data erasing among free physical blocks is larger by a predetermined value or more than that of a physical block to which a logical block is assigned earliest among physical blocks assigned a logical block, data stored in the physical block are transferred to a free physical block most often subjected to data erasing among free physical blocks. Next, this wear leveling operations will be described in detail by referring to FIG. 3 and FIG. 4.

Figure 3A:
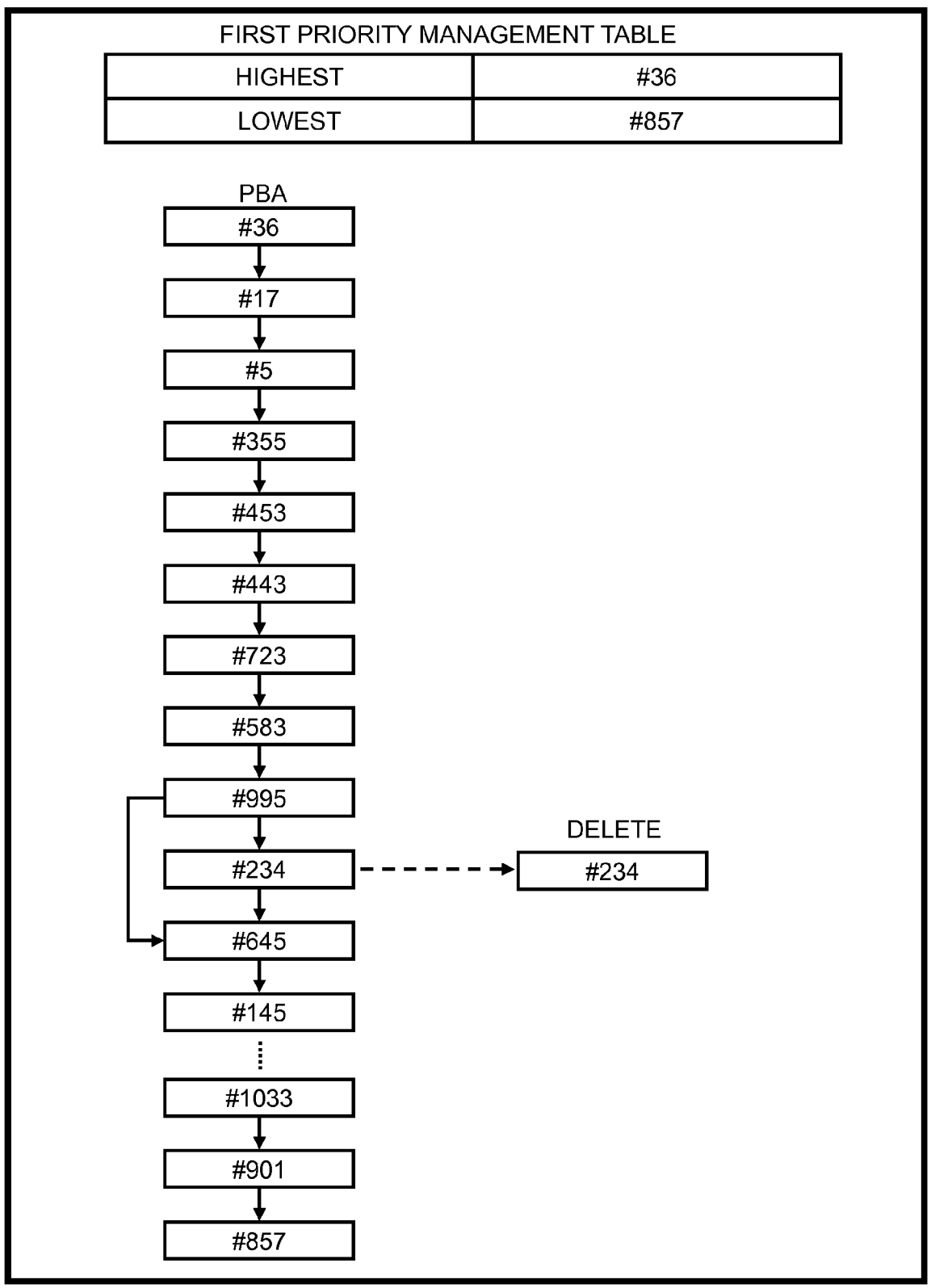
FIG. 3A is an illustration for explaining the management using the first priority management table.
Figure 3B:
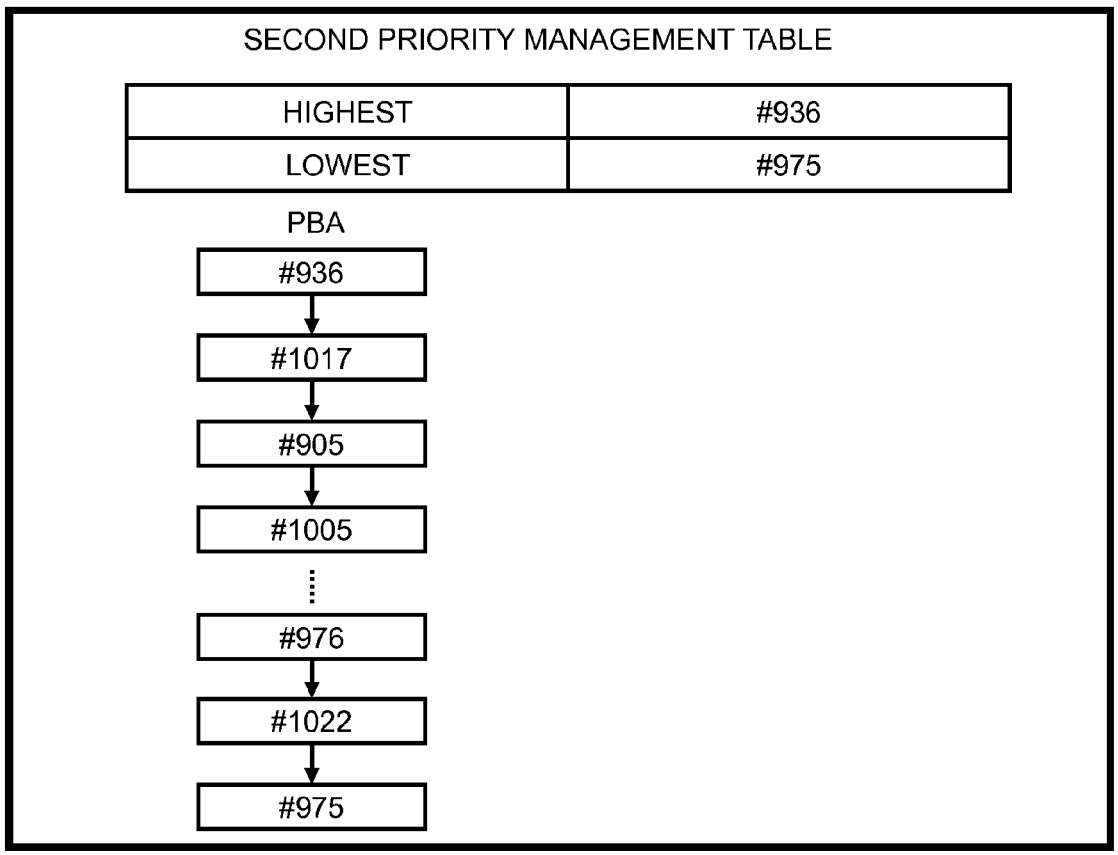
FIG. 3B is an illustration for explaining the management using the second priority management table.
Figure 3C:
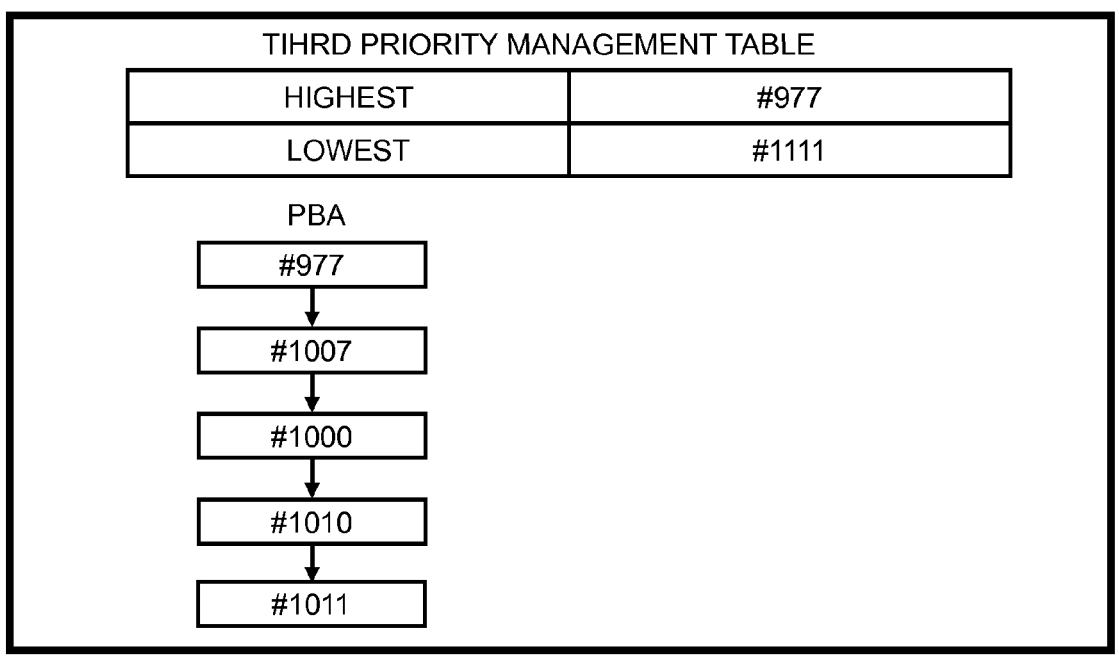
FIG. 3C is an illustration for explaining the management using the third priority management table.
Figure 4:
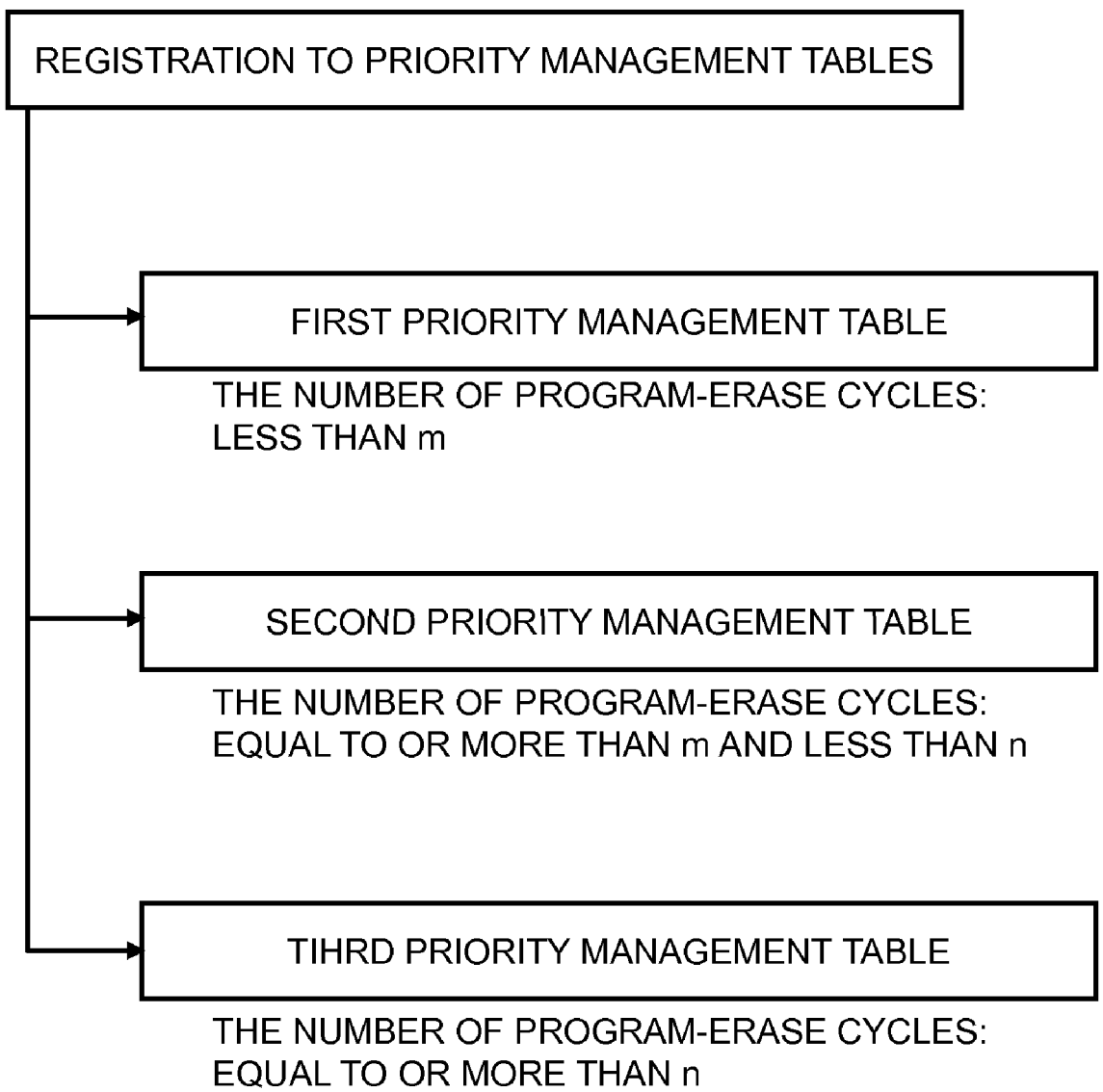
FIG. 4 is an illustration with respect to registering to the priority management tables.

In this wear leveling operations, priority order shown in FIG. 3 and priority order shown in FIG. 4 are managed. In priority order shown in FIG. 3, hereinafter referred as "assignment order", physical blocks to each of which a logical block is assigned are prioritized. In priority order shown in FIG. 4, hereinafter referred as "wear order", free physical blocks are prioritized.

It is preferable to set threshold values of the thresholds taking account of a program-erase cycling capability of a flash memory. In this embodiment, two threshold values are set on an assumption that a program-erase cycling capability of the flash memory 2 is 5,000 cycles. For example, a second threshold value n (a positive integer) is set so that n equals the program-erase cycling capability, that is, n is 5,000, and a first threshold value m (a positive integer) is smaller than the second threshold value by 1,000, that is, m is 4,000. Incidentally, the second threshold value n may be a capability limit relating to data retention time. For example, in a case where data retention time shortens markedly after program-erase cycles exceed 4,500 cycles, the second threshold value n may be 4,500.

The memory controller 3 divides physical blocks in the flash memory 2 into 3 groups on a basis of the 2 thresholds. That is, each of physical blocks belongs to any one of a first group, a second group, and a third group, which first group comprises a physical block of which program-erase cycles are from 0 to m−1 cycles (including 0 and m−1), which second group comprises a physical block of which program-erase cycles are from m to n−1 cycles (including m and n−1), which third group comprises a physical block of which program-erase cycles are n cycles or over.

In this embodiment, the memory controller 3 prioritizes physical blocks on a basis of order in which a logical block is assigned to a physical block. Next, priority management of this priority order will be detail.

By referring to FIG. 3 and FIG. 4, the priority management will be described. The priority management is performed in groups, that is, the priority management relating to the first group is performed on a basis of a first priority management table of FIG. 3A; the priority management relating to the second group is performed on a basis of a second priority management table of FIG. 3B; the priority management relating to the third group is performed on a basis of a third priority management table of FIG. 3C.

In the priority management, when assigning a logical block to a physical block, the highest priority is given to the physical block to which the logical block is just assigned. That is, a physical block to which a logical block is more recently assigned has a higher priority, and a physical block to which a logical block is assigned earlier has a lower priority. Incidentally, a physical block to which any logical block is not assigned (that is, a free physical block) is not treated as an object of the priority management, that is, priority order for physical blocks to each of which a logical block is assigned is managed.

The memory controller 3 identifies a physical block having the lowest priority in the first group on a basis of the priority management for the first group, a physical block having the lowest priority in the second group on a basis of the priority management for the second group, and a physical block having the lowest priority in the third group on a basis of the priority management for the third group.

Incidentally, a physical block having the lowest priority in the first group corresponds to a physical block to which a logical block is assigned earliest among physical blocks belonging to the first group; a physical block having the lowest priority in the second group corresponds to a physical block to which a logical block is assigned earliest among physical blocks belonging to the second group; a physical block having the lowest priority in the third group corresponds to a physical block to which a logical block is assigned earliest among physical blocks belonging to the third group.

The first priority management table of FIG. 3A is used for management of priority order for physical blocks each of which belongs to the first group and to each of which a logical block is assigned. In the first priority management table, the physical block of PBA #857 has the lowest priority. Therefore, the physical block of PBA #857 is a physical block to which a logical block is assigned earliest among the first group. The first priority management table is updated when a logical block is newly assigned to a physical block or a physical block becomes a free physical block. For example, when a logical block is newly assigned to the physical block of PBA #523, the highest priority is given to the physical block of PBA #523 (the entry of the physical block of PBA #523 is made as the highest priority in the first priority management table) and a priority of the physical block of PBA #36 changes from the highest to the second highest. Also, when the physical block of PBA #234 becomes a free physical block, the physical block of PBA #234 is excluded from an object for the first priority management table, that is, the entry of the physical block of PBA #234 is deleted from the first priority management table. As a result, a priority of the physical block of PBA #645 has a priority next to a priority of the physical block of PBA #995 in priority order according to the first priority management table.

The second priority management table of FIG. 3B is used for management of priority order for physical blocks each of which belongs to the second group and to each of which a logical block is assigned. In the second priority management table, the physical block of PBA #975 has the lowest priority. Therefore, the physical block of PBA #975 is a physical block to which a logical block is assigned earliest among the second group. The second priority management table is updated like the first priority management table. That is, when a logical block is newly assigned to a physical block, the highest priority is given to the physical block, to which the logical block is newly assigned, and a priority of the physical block of PBA #936 changes from the highest to the second highest. Also, when a physical block to which a logical block is assigned becomes a free physical block, the physical block is excluded from an object for the second priority management table, that is, an entry of the physical block is deleted from the second priority management table.

The third priority management table of FIG. 3C is used for management of priority order for physical blocks each of which belongs to the third group and to each of which a logical block is assigned. In the third priority management table, the physical block of PBA #1111 has the lowest priority. Therefore, the physical block of PBA #1111 is a physical block to which a logical block is assigned earliest among the third group. The third priority management table is updated like the first priority management table. That is, when a logical block is newly assigned to a physical block, the highest priority is given to the physical block, to which the logical block is newly assigned, and a priority of the physical block of PBA #977 changes from the highest to the second highest. Also, when a physical block to which a logical block is assigned becomes a free physical block, the physical block is excluded from an object for the third priority management table, that is, an entry of the physical block is deleted from the third priority management table.

Because the priority management is performed in groups, when a logical block is newly assigned to a physical block, the memory controller 3 selects one from among the 3 priority management tables (the first priority management table, the second priority management table, and the third priority management table) for an entry of the physical block. The selection is made on a basis of the number of program-erase cycles of the physical block.

The selection will be described by referring to FIG. 4. When program-erase cycles of a physical block to which a logical block is newly assigned is from 0 to m−1 cycles (under m cycles), an entry of the physical block is made in the first priority management table. When program-erase cycles of a physical block to which a logical block is newly assigned is from m to n−1 cycles, an entry of the physical block is made in the second priority management table. When program-erase cycles of a physical block to which a logical block is newly assigned is n cycles or over, an entry of the physical block is made in the third priority management table.

A physical block to be an assignment destination for a logical block is a free physical block. Therefore, when assigning a logical block, a search for a free physical block is performed. In the search, search table is used. The search and the search table will be described by referring to FIG. 5 and FIG. 6.

A bit on a first search table of FIG. 5A corresponds to a physical block belonging to the first group; a bit on a second search table of FIG. 5B corresponds to a physical block belonging to the second group; a bit on a third search table of FIG. 5C corresponds to a physical block belonging to the third group. That is, each physical block in the flash memory 2 corresponds to a bit on any one of the search tables according to a group to which it belongs. A logical value ("0" or "1") of a bit corresponding to each physical block indicates whether or not the physical block is available in assignment of a logical block, that is, whether or not the physical block is a free physical block.

In a first search table of FIG. 5A, a second search table of FIG. 5B, and a third search table of FIG. 5C, a bit having a logical value "0" indicates that a physical block corresponding thereto is not a free physical block or is a defective physical block; a bit having a logical value "1" indicates that a physical block corresponding thereto is a free physical block. Incidentally, because each physical block in the flash memory 2 corresponds to a bit on any one of the search tables according to a group to which it belongs, a bit not corresponding to a physical block is set to a logical value "0". Also, in the 3 search tables of FIG. 5A to 5C, 8 bits of the top row are prepared for the physical blocks of PBA #0 to #7; 8 bits of the second top row are prepared for the physical blocks of PBA #8 to #15; 8 bits of the third top row are prepared for the physical blocks of PBA #16 to #23. Similarly, in the following rows, 8 bits of each row are prepared for 8 physical blocks. The relationship between 8 bit of each row and 8 physical blocks is determined so that 8 bit of LSB (Least Significant Bit) to MSB (Most Significant Bit) correspond to 8 physical blocks of LBA #8n to #8n+7 (n is a zero or positive integer) respectively, therefore, LSB corresponds to the physical block of LBA #8n and MSB corresponds to the physical block of LBA #8n+7.

For example, by referring to the first search table of FIG. 5A, it is found that each of the physical blocks of LBA #8 and #15 is a free physical block. Also, by referring to the second search table of FIG. 5B, it is found that each of the physical blocks of LBA #0 is a free physical block.

When a physical block to which a logical block is assigned becomes a free physical block, one of the 3 search tables is updated. That is, in a case where the physical block belongs to the first group, a logical value of a bit corresponding to the physical block on the first search table is changed from "0" to "1". Also, in a case where a physical block belonging to the second group becomes a free physical block, a logical value of a bit corresponding to the physical block on the second search table is changed from "0" to "1". Also, in a case where a physical block belonging to the third group becomes a free physical block, a logical value of a bit corresponding to the physical block on the third search table is changed from "0" to "1". In other words, a selection from the 3 search tables is made on a basis of the number of program-erase cycles of a physical block becoming a free physical block.

Figure 6:
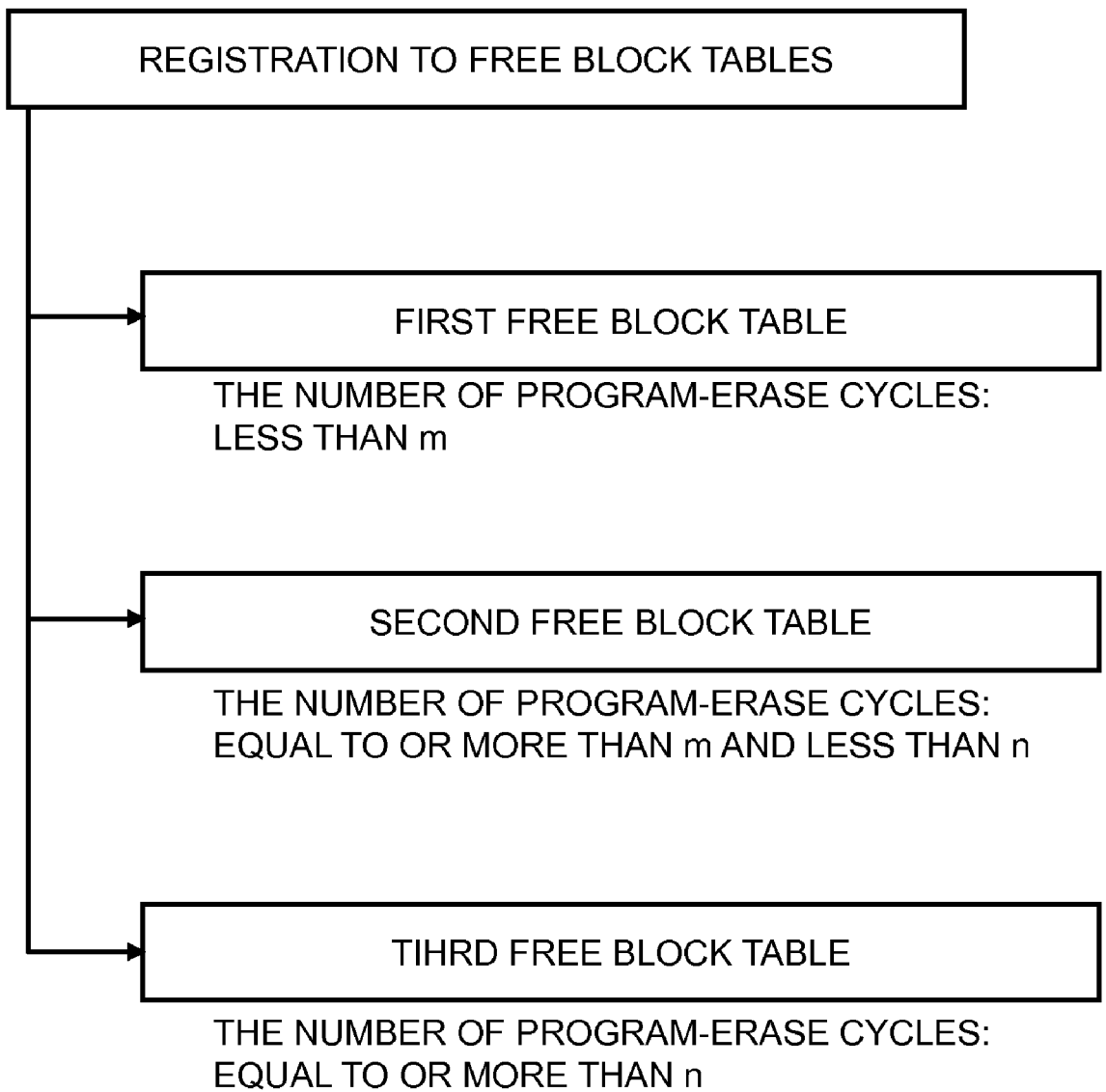
FIG. 6 is an illustration with respect to registering to the free block tables.

Specifically, as shown in FIG. 6, in a case where program-erase cycles of a physical block becoming a free physical block is from 0 to m−1 cycles, the first search table corresponding to the first group is selected because the physical block belongs to the first group. Also, in a case where program-erase cycles of a physical block becoming a free physical block is from m to n−1 cycles, the second search table corresponding to the second group is selected because the physical block belongs to the second group. Also, in a case where program-erase cycles of a physical block becoming a free physical block is n cycles or over, the third search table corresponding to the third group is selected because the physical block belongs to the third group.

In most case, a search for a free physical block with each of the 3 search tables is performed when there is not a physical block to which a logical block is assigned corresponding to data to be written or the physical block does not have a free area (free physical page) for storage of the data. The logical block is assigned to a physical block searched out by the search, and then the data are written to the physical block.

In this embodiment, the number of program-erase cycles of a physical block belonging to the first group is smaller than that of a physical block belonging to the second group, and the number of program-erase cycles of a physical block belonging to the second group is smaller than that of a physical block belonging to the third group. In other words, the number of program-erase cycles covered by the first group is smaller than that covered by the second group, and the number of program-erase cycles covered by the second group is smaller than that covered by the third group. In the group structure, a search with the first search table for the first group precedes that with the second search table for the second group, and a search with the second search table for the second group precedes that with the third search table for the third group. That is, in a search for a free physical block, plural search tables are used in order from a search table for a group covering a small number of program-erase cycles.

Specifically, a search with the first search table is performed first, a search with the second search table is performed when a free physical block is not searched out by a search with the first search table, and a search with the third search table is performed when a free physical block is not searched out by a search with the second search table.

Because a search with a search table for a group covering a small number of program-erase cycles precedes that for a group covering a large number of program-erase cycles, a free physical block among a group covering a small number of program-erase cycles precedes that among a group covering a large number of program-erase cycles in assignment of a logical block. As a result, the number of program-erase cycles of a physical block among a group covering a large number of program-erase cycles increases more slowly than that among a group covering a small number of program-erase cycles.

Although the above search is implemented when assigning a logical block to a free physical block, an increase in the number of program-erase cycles of a physical block among a group covering a large number of program-erase cycles is not adequately controlled in a particular case. For example, in a case where most of physical blocks belonging to a group covering a small number of program-erase cycles store static data, an increase in the number of program-erase cycles of a physical block among a group covering a large number of program-erase cycles is not adequately controlled. The problem is solved by controlling assignment of a logical block so as to store static data in a physical block among a group covering a large number of program-erase cycles.

To implement the solution, in this embodiment, when searching out a free physical block, it is determined whether or not there are one or more physical blocks included in a group which covers a smaller number of program-erase cycles than that covered by a group including the free physical block, and then, in response to a positive determination that there are the one or more physical blocks, data stored in a physical block having the highest priority of the one or more physical blocks is transferred to the free physical block searched out. The physical block having the highest priority (that is the physical block to which a logical block is assigned latest) among a group including it. The physical block having the highest priority is identified on a basis of the above priority management. After the transfer of data stored in the physical block having the highest priority, the physical block having the highest priority is used instead of the free physical block searched out, that is, a logical block is newly assigned to the physical block having the highest priority and stores data corresponding to the logical block.

By the replacement between a free physical block searched out and a physical block having the highest priority, physical blocks among a group covering a large number of program-erase cycles store static data or the like because there is a high probability that the physical block having a highest priority stores static data and the physical block having a highest priority is included in a group which covers a smaller number of program-erase cycles than that covered by a group including the free physical block searched out. As a result, an increase in the number of program-erase cycles of a physical block among a group covering a large number of program-erase cycles is adequately controlled and becomes slower.

A range of the number of program-erase cycles covered by each group is predetermined from a small number of program-erase cycles to a large number of program-erase cycles in order of the first group, the second group, and third group. Therefore, in a case where a free physical block is searched out by a search with the second search table or by a search with the third search table, there is a possibility that there is a physical block included in a group which covers a smaller number of program-erase cycles than that covered by a group including the free physical block. That is, in a case where a free physical block is searched out by a search with the second search table, there is a possibility that there is a physical block included in the first group because the first group covers a smaller number of program-erase cycles than that covered by the second group. Also, in a case where a free physical block is searched out by a search with the third search table, there is a possibility that there is a physical block included in the first group or the second group because the first group and the second group cover a smaller number of program-erase cycles than that covered by the third group.

For example, in a case where there is not a free physical block included in the first group and there is a free physical block included in the second group, a free physical block is searched out by a search with the second search table. When searching out a free physical block by a search with the second search table, by referring to the first priority management table, a physical block having the lowest priority among the first group is identified, that is, a physical block to which a logical block is assigned earliest among the first group is identified. And then, data stored in the physical block having the lowest priority are transferred to the free physical block searched out. After completing the data transfer, data stored in the physical block having the lowest priority are erased. And then, the physical block having the lowest priority stores data provided from the host system 4. By the data transfer, a logical block assigned to the physical block having the lowest priority is assigned to the free physical block searched out, and a logical block corresponding to the data provided from the host system 4 is assigned to the physical block having the lowest priority. Incidentally, because there is a high probability that data stored in the physical block having a highest priority is static data or the like, there is a high probability that the free physical block searched out stores static data or the like by the data transfer.

Incidentally, in a case where there is not a physical block included in the first group, the free physical block searched out stores data provided from the host system 4 and a logical block corresponding to the data provided from the host system 4 is assigned to the free physical block searched out.

Also, in a case where there is neither a free physical block included in the first group nor that included in the second group and there is a free physical block included in the third group, a free physical block is searched out by a search with the third search table.

In a case where there is a physical block included in the first group, a physical block having the lowest priority among the first group is identified on a basis of the first priority management table when searching out a free physical block by a search with the third search table. And then, data stored in the physical block having the lowest priority among the first group are transferred to the free physical block searched out. After completing the data transfer, data stored in the physical block having the lowest priority are erased and the physical block having the lowest priority stores data provided from the host system 4.

In a case where there is not a physical block included in the first group and there is a physical block included in the second group, a physical block having the lowest priority among the second group is identified on a basis of the second priority management table when searching out a free physical block by a search with the third search table. And then, data stored in the physical block having the lowest priority among the second group are transferred to the free physical block searched out. After completing the data transfer, data stored in the physical block having the lowest priority are erased and the physical block having the lowest priority stores data provided from the host system 4.

That is, in a case where there is a physical block included in the first group, a free physical block searched out from the third group stores data stored in a physical block having the lowest priority among the first group and a logical block, until then, corresponding to the physical block included in the first group is assigned to the free physical block. Also, in a case where there is not a physical block included in the first group and there is a physical block included in the second group, a free physical block searched out from the third group stores data stored in a physical block having the lowest priority among the second group and a logical block, until then, corresponding to the physical block included in the second group is assigned to the free physical block.

As described above, in a case where a free physical block among the third group is searched out by a search with the third search table, the free physical block store static data or the like by transferring them from a physical block among the first group or the second group to the free physical block among the third group, which physical block among the first group or the second group becomes free and is newly assigned a logical block.

Incidentally, when there is neither a physical block included in the first group nor that included in the second group, the free physical block among the third group stores data provided from the host system 4 and a logical block corresponding to the data is assigned to the free physical block searched out.

Next, management of the number of program-erase cycles of each physical block and that of priority order for physical blocks will be described by referring to FIG. 7. A management table of FIG. 7 indicates a first link number, a second link number, and the number of program-erase cycles by a physical block in order of PBA (A management table of FIG. 7 has an entry for a first link number, an entry for a second link number, and an entry for the number of program-erase cycles by a physical block). The first link number of each physical block is PBA of a physical block of which a priority is higher by one level than that of the each physical block. The second link number of each physical block is PBA of a physical block of which a priority is lower by one level than that of the each physical block. Therefore, a physical block having the highest priority does not have the first link number, a physical block having the lowest priority does not have the second link number, and a physical block not assigned a logical block has neither the first link number nor the second link number.

For example, by referring to the management table of FIG. 7, it is found that a priority of the physical block of PBA #118 is higher by one level than that of the physical block of PBA #0 and a priority of the physical block of PBA #572 is lower by one level than that of the physical block of PBA #0.

The management table of FIG. 7 has a top pointer and a bottom pointer for each group. The top pointer and the bottom pointer for the first group are to indicate a physical block having the highest priority and that having the lowest priority among the first group respectively, the top pointer and the bottom pointer for the second group are to indicate a physical block having the highest priority and that having the lowest priority among the second group respectively, the top pointer and the bottom pointer for the third group are to indicate a physical block having the highest priority and that having the lowest priority among the third group respectively.

When a physical blocks having the highest priority changes to another physical block, PBA set in the top pointer changes to PBA of the another physical block. Also, when a physical blocks having the lowest priority changes to another physical block, PBA set in the bottom pointer changes to PBA of the another physical block. For example, in a case where data stored in a physical block having the lowest priority among the first group is transferred to another physical block, and then the physical block corresponding to the transfer source is newly assigned a logical block, a priority of the physical block corresponding to the transfer source changes from the lowest to the highest and a priority of a physical block, until then, having the second lowest priority changes to the lowest. Therefore, in the case, PBA of the physical block corresponding to the transfer source is newly set in the top pointer of the first group and PBA of the physical block, until then, having the second lowest priority is newly set in the bottom pointer of the first group.

Update of the management table will be described on the assumption that the physical block corresponding to the transfer source is the physical block of PBA #857. PBA #857 is set as PBA of a physical block having the highest priority in the top pointer of the first group and PBA of a physical block, until then, having the second lowest priority is set as PBA of a physical block having the lowest priority in the in the bottom pointer of the first group instead, because a priority of a physical block of PBA #857 changes from the lowest to the highest. The PBA of a physical block having the second lowest priority is identified on a basis of the first link number of the physical block of PBA #857. Also, PBA set in an entry of the first link number of the physical block of PBA #857 is erased, and PBA set in an entry for the second link number of a physical block of PBA #857 is changed to PBA #36. Also, PBA #857 is set in an entry of the first link number of the physical block of PBA #36. PBA set in an entry for the second link number of a physical block, until then, having the second lowest priority is erased.

The number of program-erase cycles on the management table of FIG. 7 is rewritten whenever each physical block is subjected to data erasing (data erasing is performed on each physical block). For example, when data stored in the physical block of PBA #0 are erased (data erasing is performed on the physical block of PBA #0), 1000 as the number of program-erase cycles of a physical block of PBA #0 is rewritten to 1001 on the management table. In addition, PBAs set in entries of the first link number of a physical block of PBA #0 and the second link number of that are erased. In priority order, order of the physical block of PBA #118, the physical block of PBA #0, and a physical block of PBA #572 changes to order of the physical block of PBA #118, and the physical block of PBA #572, because the physical block of PBA #0 has lost a position in the priority order. Therefore, the second link number of the physical block of PBA #118 changes from PBA #0 to PBA #572 and the first link number of the physical block of PBA #572 changes from PBA #0 to PBA #118.

In foregoing specification, specific embodiments of the present invention have been described. However, the scope of the present invention is not limited to the embodiment. Of course, various modifications and changes can be made without departing from the scope of the present invention.

For example, in the embodiments described above, management of the number of program-erase cycles, management of priority order for physical blocks to each of which a logical block is assigned, and a search of a free physical block is performed in physical blocks. However, in a case where a logical block is assigned to a virtual block composed of plural physical blocks and the relationship a logical block and the virtual block is managed, they may be performed in virtual blocks. That is, a virtual block can be treated as one unit if each virtual block is composed of predetermined physical blocks. In this case, the first link number, the second link number, and the number of program-erase cycles are set in a management table by a virtual block. That is, a serial number assigned to each virtual block may be set as the first link number or the second link number on the management table and the number of program-erase cycles as a virtual block may be set in the management table. Also, in the search of a free physical block, a search table where each bit is assigned one virtual block may be used.

Also, in the embodiments described above, in a case where a free physical block among the third group is searched out with the third search table, data stored in a physical block to which a logical block is assigned earliest (a physical block having the lowest priority) may be transferred to the free physical block searched out if there is neither a physical block included in the first group nor that included in the first group. The data transfer is performed only when the number of program-erase cycles of the free physical block searched out is larger by a predetermined value than that of the physical block earliest assigned a logical block. By implementing such the data transfer, the difference between the maximum of the number of program-erase cycles and the minimum of that among the third group is controlled so that it becomes smaller.

Incidentally, management of the number of program-erase cycles, management of priority order, and a search of a free physical block may be performed in a different manner from the above as far as their object can be achieved.

What is claimed is:

1. A memory controller for controlling access to one or more flash memories in which data erasing is performed in physical blocks, comprising:
   a logical block management unit which forms plural logical blocks each composed of plural logical sectors to each of which a logical address for a host system is assigned;
   a program-erase cycles management unit which manages a number of program-erase cycles of each physical block;
   an assignment unit which assigns a logical block composed of plural logical sectors each assigned a logical address provided from a host system to a physical block;
   a search unit which searches out a free physical block among each of groups into which physical blocks are divided on a basis of one or more predetermined thresholds relating to a number of program-erase cycles;
   an identifying unit which identifies a physical block to which a logical block is assigned earliest among each of the groups;
   a data writing unit which, in response to a request issued by the host system, identifies a logical block including a logical sector corresponding to a logical address pertaining to the request and stores data provided from the host system in a physical block corresponding to the logical block identified; and
   a data transfer unit which transfers data stored in a physical block identified by the identifying unit to a free physical block searched out by the search unit;
   wherein, when the assignment unit assigns a logical block to a physical block, the search unit performs a search for a free physical block so that a free physical block among a first group of the groups precedes a free physical block among a second group of the groups, which covers a larger number of program-erase cycles than that covered by the first group, in the search; and
   wherein, in a case where there is at least one physical block included in a third group of the groups, which covers a smaller number of program-erase cycles than that covered by a group including a free physical block searched out in the search, the identifying unit identifies a physical block to which a logical block is assigned earliest among the third group, the data transfer unit transfers data stored in the physical block identified to the free physical block searched out, and the assignment unit assigns the logical block to the physical block identified after the data transfer unit completes data transfer.

2. A memory controller for controlling access to one or more flash memories in which data erasing is performed in physical blocks, comprising:
   a logical block management unit which forms plural logical blocks each composed of plural logical sectors to each of which a logical address for a host system is assigned;
   a virtual block management unit which forms plural virtual blocks into which physical blocks are divided;
   a program-erase cycles management unit which manages a number of program-erase cycles of each virtual block;
   an assignment unit which assigns a logical block composed of plural logical sectors each assigned a logical address provided from a host system to a virtual block;
   a search unit which searches out a free virtual block among each of groups into which virtual blocks are divided on a basis of one or more predetermined thresholds relating to a number of program-erase cycles;
   an identifying unit which identifies a virtual block to which a logical block is assigned earliest among each of the groups;
   a data writing unit which, in response to a request issued by the host system, identifies a logical block including a logical sector corresponding to a logical address pertaining to the request and stores data provided from the host system in a virtual block corresponding to the logical block identified; and
   a data transfer unit which transfers data stored in a virtual block identified by the identifying unit to a free virtual block searched out by the search unit;
   wherein, when the assignment unit assigns a logical block to a virtual block, the search unit performs a search for a free virtual block so that a free virtual block among a first group of the groups precedes a free virtual block among a second group of the groups, which covers a larger number of program-erase cycles than that covered by the first group, in the search; and
   wherein, in a case where there is at least one virtual block included in a third group of the groups, which covers a smaller number of program-erase cycles than that covered by a group including a free virtual block searched out in the search, the identifying unit identifies a virtual block to which a logical block is assigned earliest among the third group, the data transfer unit transfers data stored in the virtual block identified to the free virtual block searched out, and the assignment unit assigns the logical block to the virtual block identified after the data transfer unit completes data transfer.

3. A memory system comprising:
   a memory controller according to claim 1; and
   one or more flash memories to which access is controlled by the memory controller.

4. A memory system comprising:
   a memory controller according to claim 2; and
   one or more flash memories to which access is controlled by the memory controller.

5. A method for controlling access to one or more flash memories, in which data erasing is performed in physical blocks, comprising:
   a logical block management step of forming plural logical blocks each composed of plural logical sectors to each of which a logical address for a host system is assigned;
   a program-erase cycles management step of managing a number of program-erase cycles of each physical block;
   an assignment step of assigning a logical block composed of plural logical sectors each assigned a logical address provided from a host system to a physical block;
   a search step of searching out a free physical block among each of groups into which physical blocks are divided on a basis of one or more predetermined thresholds relating to a number of program-erase cycles;
   an identifying step of identifying a physical block to which a logical block is assigned earliest among each of the groups;
   a data writing step of, in response to a request issued by the host system, identifying a logical block including a logical sector corresponding to a logical address pertaining to the request and stores data provided from the host system in a physical block corresponding to the logical block identified; and a data transfer step of transferring data stored in a physical block identified in the identifying step to a free physical block searched out in the search step;

wherein, when assigning a logical block to a physical block in the assignment step, performing a search for a free physical block so that a free physical block among a first group of the groups precedes a free physical block among a second group of the groups, which covers a larger number of program-erase cycles than that covered by the first group, in the search step; and wherein, in a case where there is at least one physical block included in a third group of the groups, which covers a smaller number of program-erase cycles than that covered by a group including a free physical block searched out in the search step, identifying a physical block to which a logical block is assigned earliest among the third group in the identifying step, transferring data stored in the physical block identified to the free physical block searched out in the data transfer step, and assigning the logical block to the physical block identified, in the assignment step, after completing data transfer in the data transfer step.

6. A method for controlling access to one or more flash memories, in which data erasing is performed in physical blocks, comprising:

a logical block management step of forming plural logical blocks each composed of plural logical sectors to each of which a logical address for a host system is assigned;

a virtual block management step of forming plural virtual blocks into which physical blocks are divided;

a program-erase cycles management step of managing a number of program-erase cycles of each virtual block;

an assignment step of assigning a logical block composed of plural logical sectors each assigned a logical address provided from a host system to a virtual block;

a search step of searching out a free virtual block among each of groups into which virtual blocks are divided on a basis of one or more predetermined thresholds relating to a number of program-erase cycles;

an identifying step of identifying a virtual block to which a logical block is assigned earliest among each of the groups;

a data writing step of, in response to a request issued by the host system, identifying a logical block including a logical sector corresponding to a logical address pertaining to the request and stores data provided from the host system in a virtual block corresponding to the logical block identified; and a data transfer step of transferring data stored in a virtual block identified in the identifying step to a free virtual block searched out in the search step;

wherein, when assigning a logical block to a virtual block in the assignment step, performing a search for a free virtual block so that a free virtual block among a first group of the groups precedes a free virtual block among a second group of the groups, which covers a larger number of program-erase cycles than that covered by the first group, in the search step; and wherein, in a case where there is at least one virtual block included in a third group of the groups, which covers a smaller number of program-erase cycles than that covered by a group including a free virtual block searched out in the search, identifying a virtual block to which a logical block is assigned earliest among the third group in the identifying step, transferring data stored in the virtual block identified to the free virtual block searched out in the data transfer step, and assigning the logical block to the virtual block identified, in the assignment step, after completing data transfer in the data transfer step.

* * * * *